(12) United States Patent
Grun

(10) Patent No.: US 6,272,591 B2
(45) Date of Patent: Aug. 7, 2001

(54) RAID STRIPING USING MULTIPLE VIRTUAL CHANNELS

(75) Inventor: Paul A. Grun, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/174,580

(22) Filed: Oct. 19, 1998

(51) Int. Cl.$^7$ .................................................. G06F 13/16
(52) U.S. Cl. .............................. 711/114; 710/22; 710/52
(58) Field of Search ........................... 711/114; 710/22, 710/52

(56) References Cited

U.S. PATENT DOCUMENTS

| | | | |
|---|---|---|---|
| 5,613,071 | * 3/1997 | Rankin et al. | 707/10 |
| 6,081,848 | * 6/2000 | Grun et al. | 710/1 |

OTHER PUBLICATIONS

Dunning et al., "The Virtual Interface Architecture", IEEE Micro, Mar.–Apr. 1998, vol. 18, issue 2, pp. 66–76.*
Intel and the VI Architecture: Frequently Asked Questions. [Retrieved Online May 11, 1998] URL: www.intel.com/p...rs/isv/vi/html/whats_VI/Vi_FAQ.htm.

* cited by examiner

*Primary Examiner*—Reginald G. Bragdon
(74) *Attorney, Agent, or Firm*—Antonelli, Terry, Stout & Kraus, LLP

(57) ABSTRACT

A RAID device stripes a data block across N disk drives. The RAID device receives a storage request from a host computer for the data block, and creates N virtual interface ("VI") queue pairs. The queue pairs form N virtual channels to the host computer. Further, the RAID device posts a descriptor to each of the queue pairs, with each descriptor referring to 1/Nth of the data block. Further, the RAID device receives 1/Nth of the data block over each of the virtual channels and writes each received 1/Nth data block to a different one of the N disk drives.

20 Claims, 2 Drawing Sheets

RAID STRIPING USING MULTIPLE VIRTUAL CHANNELS

FIELD OF THE INVENTION

The present invention is directed to RAID devices. More particularly, the present invention is directed to striping data on a RAID device using multiple virtual channels.

BACKGROUND OF THE INVENTION

Redundant Array of Inexpensive or Independent Disks ("RAID") devices are an increasingly popular way to store large amounts of computer data. RAID devices typically consist of a RAID controller and multiple low capacity personal computer type disk drives that are bundled together to form a single high capacity drive. A RAID device is usually less expensive than conventional high capacity drives because the personal computer type drives are relatively inexpensive based on their high volume of production.

Because RAID devices include multiple disk drives, the probability that one of the drives will fail at any given time is relatively high. An issue with RAID devices is how to avoid the loss of data when one or more of the drives fail. One solution to this issue is to "stripe" a single data block across multiple disk drives in the RAID device. The data block is striped by breaking the block into multiple pieces or portions and storing each portion on a different disk drive. Frequently, parity information for the entire block is stored on one of the drives. If a single drive fails, the piece of the data block that was stored on the failed drive can be reassembled based on the remaining portions of the data block and the parity information stored on the other drives. U.S. Pat. No. 4,761,785 discloses an example of a RAID device that performs striping.

In most RAID devices, a host computer sends an entire data block in one piece to the RAID controller. The RAID controller must then partition the data block into multiple sub-blocks, calculate a parity block, and then write the sub-blocks and parity block to the disk drives. Because the RAID controller is required to perform all of these steps each time a data block is stored, the RAID controller causes some delay when data is stored on a RAID device. The delay can detrimentally slow the process of striping data on a RAID device.

Based on the foregoing, there is a need for an method and apparatus to more efficiently stripe data on a RAID device.

SUMMARY OF THE INVENTION

One embodiment of the present invention is a RAID device for striping a data block across N disk drives. The RAID device receives a storage request from a host computer for the data block, and creates N virtual interface ("VI") queue pairs. The queue pairs form N virtual channels to the host computer. Further, the RAID device posts a descriptor to each of the queue pairs, with each descriptor referring to 1/Nth of the data block. Further, the RAID device receives 1/Nth of the data block over each of the virtual channels and writes each received 1/Nth data block to a different one of the N disk drives.

DETAILED DESCRIPTION

One embodiment of the present invention is a RAID device that transfers a data block over multiple virtual channels using a virtual interface. The multiple virtual channels each transfer a portion of the data block, and the portions are striped across multiple disk drives.

Figure 1:
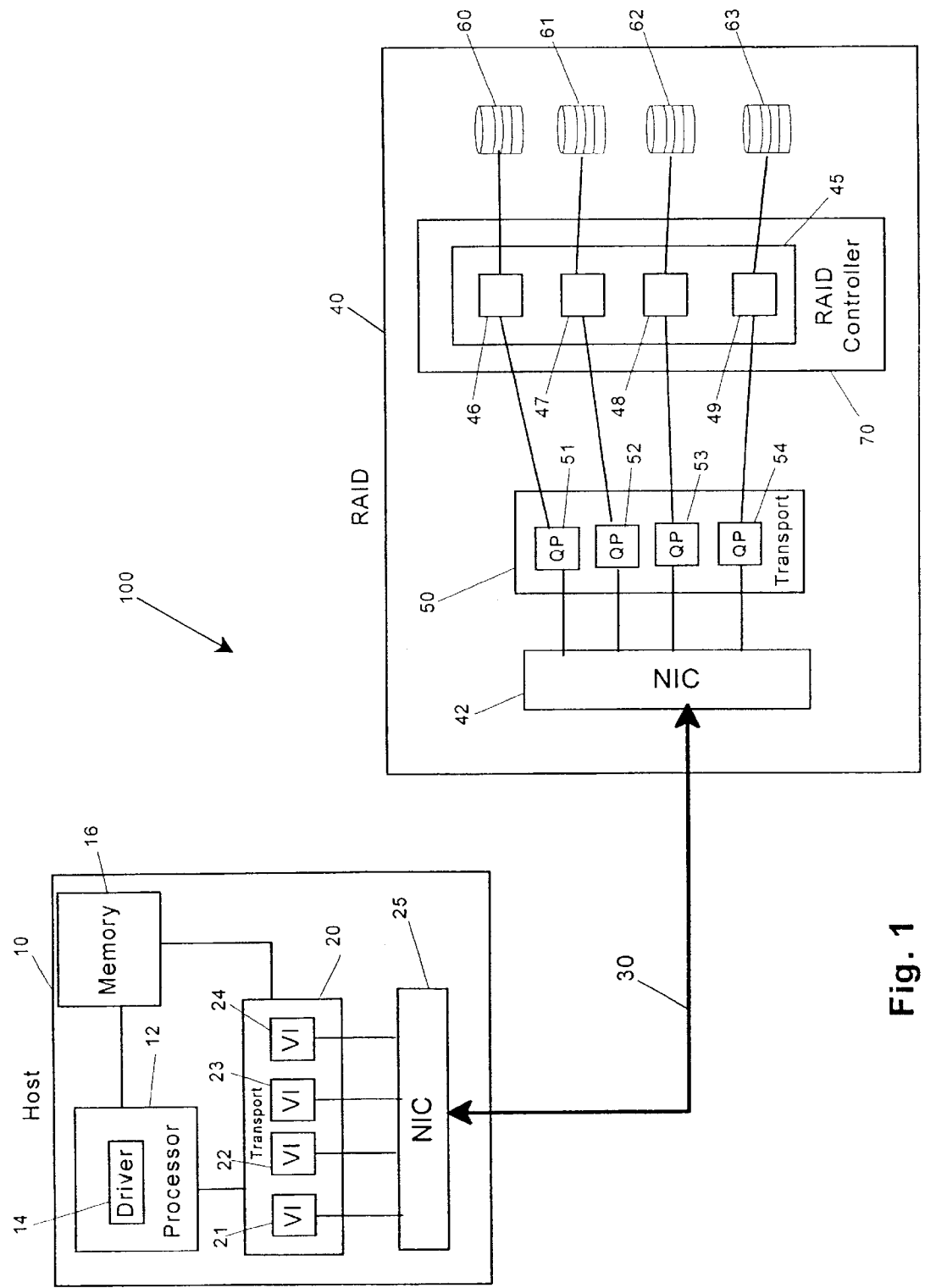
FIG. 1 is block diagram of a computer system in accordance with one embodiment of the present invention.

FIG. 1 is a block diagram of a computer system in accordance with one embodiment of the present invention. The computer system 100 includes a host computer 10 coupled to a RAID device 40. Host computer 10 is coupled to RAID device 40 in FIG. 1 via a direct connection 30 such as a single wire or multiple wires. However, in other embodiments, host computer 10 can be coupled to RAID device 40 using any known manner to transfer data, including switches, a computer network, and wireless techniques. Further, additional computers and other devices may be coupled to RAID device 40.

Host computer 10 includes a processor 12. Processor 12 executes a software application that includes a driver 14. Host computer 10 further includes a memory 16 and a transport 20. Host computer 10 further includes a network interface card ("NIC") 25 that couples host computer 10 to RAID device 40.

Host computer 10 communicates with devices coupled to it such as RAID device 40 using a Virtual Interface ("VI") architecture. A VI architecture provides the illusion of a dedicated network interface to multiple applications and processes simultaneously, thus "virtualizing" the interface. Further, a VI architecture defines a standard interface between a VI consumer and one or more networks. In the present invention, driver 14 can function as a VI consumer.

In one embodiment, the VI architecture used to implemented the present invention is disclosed in the *Virtual Interface Architecture Specification, Version* 1.0, (the "VI Specification") announced Dec. 19, 1997 by Compaq Corp., Intel Corp., and Microsoft Corp. The VI Specification is available at Web site www.viarch.org/ on the Internet. The VI Specification defines mechanisms for low-latency, high-bandwidth message-passing between interconnected nodes and interconnected storage devices. Low latency and sustained high bandwidth are achieved by avoiding intermediate copies of data and bypassing the operating system when sending and receiving messages. Other architectures that perform a similar function as the VI architecture disclosed in the VI Specification can also be used to implement the present invention, and therefore the present invention is not limited to a single VI architecture.

Transport 20 includes a plurality of VIs 21–24. Each VI 21–24 includes a queue pair ("QP"). In accordance with the VI Specification, a QP includes a send queue and a receive queue.

RAID device 40 includes a plurality of disk drives 60–63. Disk drives 60–63 are coupled to a RAID controller 70. RAID controller 70 executes steps in connection with storing and retrieving data to and from disk drives 60–63. RAID controller 70 includes a memory storage area 45 that includes a number of memory storage locations 46–49.

RAID device 40 further includes a transport 50 coupled to a NIC 42. NIC 42 couples RAID device 40 to host computer 10. Transport 50 includes a number of QPs 51–54. A QP in RAID device 40 and a corresponding VI in host computer 10 form endpoints of a virtual channel between RAID device 40 and host computer 10. In one embodiment, when storing a data block on RAID device 40, the number of disk drives 60–63 (referred to as "N") equals the number of memory locations 46–49, the number of QPs 51–54 and the number of VIs 21–24. Therefore, if the data block is being striped across N disk drives, RAID controller will have N memory locations, transport 50 will have N QPs, and transport 20 will have N corresponding VIs. The N QPs and the N VIs form endpoints of N virtual channels.

Within computer system 100, driver 14 is referred to as an "initiator" because it initiates requests for storing or retrieving data. In contrast, RAID device 40 is referred to as a "target" because it responds to requests from initiators within computer system 100. RAID device 40 responds to requests by, for example, storing data on drives 60–63 or retrieving data from drives 60–63.

Figure 2:
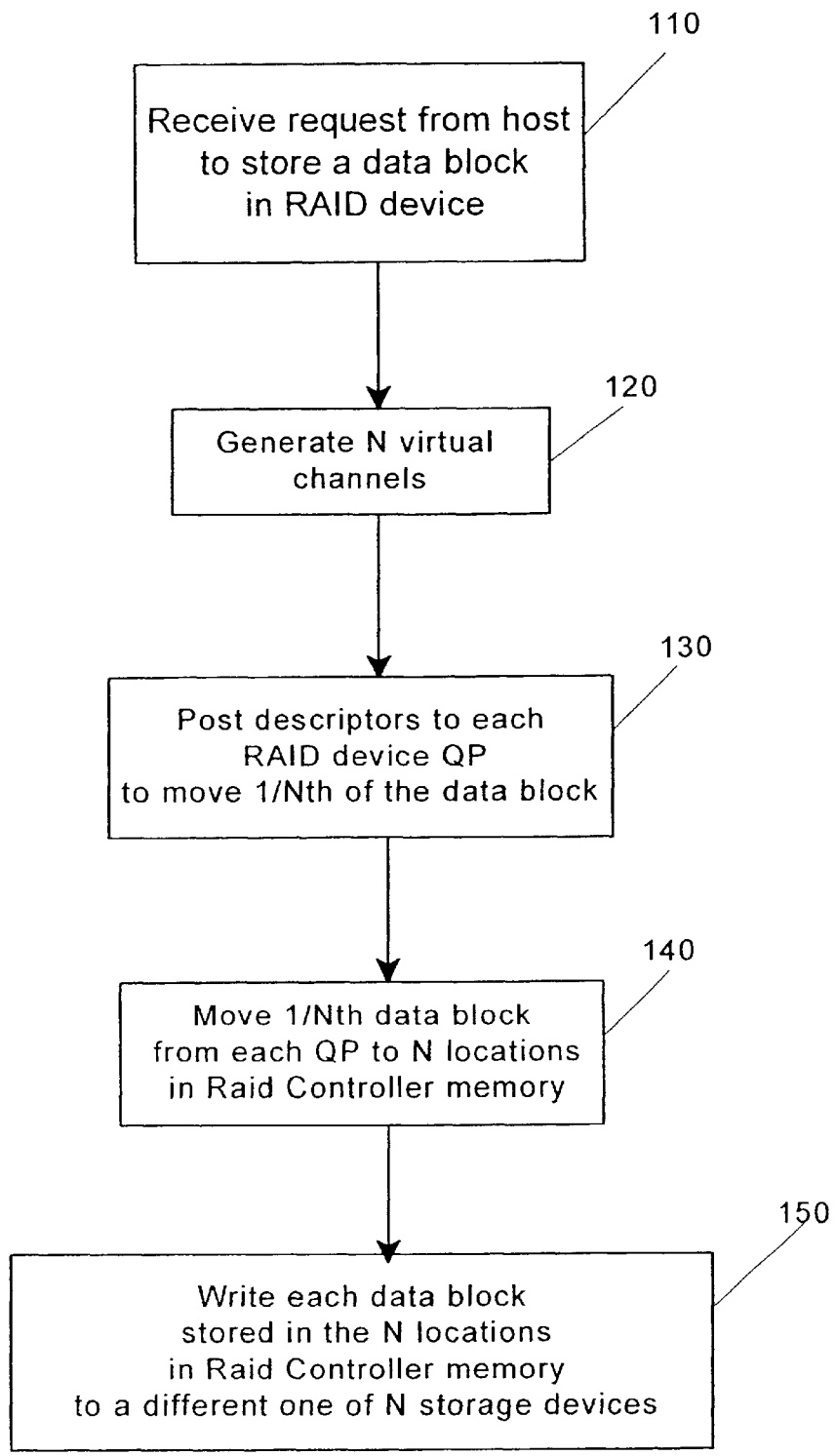
FIG. 2 is a flowchart of the steps executed by a RAID device in one embodiment of the present invention when a request is received from a host computer to store a data block in the RAID device.

FIG. 2 is a flowchart of the steps executed by RAID device 40 in one embodiment of the present invention when an I/O request is received from host computer 10 to store a data block in RAID device 40. It is assumed that RAID device 40 stripes data blocks across "N" disk drives.

The request is received at step 110 and includes the location in memory 16 of host computer 10 where the data block is stored. Driver 14 stores the I/O request in a location of memory 16. In accordance with the VI specification, driver 14 posts a descriptor that refers to the I/O request (i.e., specifies the location in memory 16 where the I/O request is stored) to a send queue in transport 20. Driver 14 then rings a doorbell in NIC 25. The doorbell tells NIC 25 to look in the send queue for the descriptor. NIC 25 then fetches the descriptor and performs the task. The task places an I/O request message on connection 30 to be transmitted. The receiving device (i.e., RAID device 40) of the I/O request also has a NIC (i.e., NIC 42) that receives the I/O request message from connection 30.

The I/O request message contains information specifying the location in host memory 16 from which the data is to be moved, and specifies where in RAID device 40 the data is to be stored. The location in host memory 16 is specified with a virtual address memory handle pair in accordance with the VI specification. RAID device 40 uses the information contained in the I/O request message to build descriptors to accomplish the actual data movement from host computer 10 to RAID device 40. For example, in response to receiving the request from host computer 10, in one embodiment RAID device 40 initiates a data transfer from host computer 10. The data transfer is initiated using a VI Remote Direct Memory Access ("RDMA") transfer facility.

At step 120, in one embodiment RAID device 40 generates N virtual channels across direct connection 30. The virtual channels are generated by creating N QPs 51–54 in transport 50, and requesting host computer 10 to create N VIs 21–24 in transport 20. In another embodiment, the N virtual channels were previously generated before the request at step 110 was received.

At step 130, RAID device 40 posts descriptors to each QP 51–54. The descriptors specify that each QP 51–54 should move 1/Nth of the data block stored in memory 16 across the virtual channel associated with each QP 51–54. The data is then moved across the virtual channels in accordance with the VI specification.

At step 140, the 1/Nth data blocks moved by each QP 51–54 are stored in memory locations 46–49 of memory 45. Each 1/Nth data block is stored in a separate memory location 46–49.

Finally, at step 150, RAID controller 70 writes each 1/Nth data block stored in memory 45 to a different disk drive 60–63. Therefore, the original data block is striped across disk drives 60–63 because portions of the data block are written to each drive 60–63.

Parity data may also be generated and stored in disk drives 60–63. The parity data may be generated by RAID controller 70, or by host computer 10.

As described, the RAID device in accordance with the present invention uses the services of the VI transport to partition a single data block into N sub-blocks at the same time that the data block is being transported from the host computer to the RAID device. Therefore, the RAID controller in the RAID device does not have to partition the data block in order to stripe the data block across N disk drives.

The present invention allows the benefits of RAID (e.g., low costs disks, high performance and high reliability) without requiring a sophisticated RAID controller, or without requiring a RAID controller at all (since the responsibilities of RAID controller 70 are merely to write the data from "N" memory locations to the "N" devices). Further, the latency that is caused by the RAID controller is reduced, and the entire functionality of the RAID controller can be implemented in software.

The present invention also provides benefits when data is read from RAID device 40 by host computer 10. For example, when reading data, RAID controller 70 does not have to wait to finish reading data off all of disks 60–63 and into memory 45 before it begins writing the 1/Nth blocks into host memory 16. Thus, as soon as any one of disks 60–63 has finished returning its 1/Nth to one of the N memory locations in memory 45, RAID controller 70 can begin moving that part of the block to host memory 45.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although memory 45 is located within RAID controller 70, it can be located anywhere it can be coupled to RAID controller 70.

What is claimed is:

1. A method of striping a data block across N disk drives, said method comprising:
   (a) receiving a storage request from a host computer for the data block;
   (b) creating N virtual interface (VI) queue pairs, wherein the queue pairs form N virtual channels to the host computer;
   (c) posting a descriptor to each of the queue pairs, each descriptor referring to 1/Nth of the data block;
   (d) receiving 1/Nth of the data block over each of the virtual channels; and
   (e) writing each received 1/Nth data block to a different one of the N disk drives.

2. The method of claim 1, wherein the N virtual channels comprise one or more physical connections.

3. The method of claim 1, wherein the storage request is a VI send.

4. The method of claim 1, further comprising:
   initiating a VI Remote Direct Memory Access in response to the request.

5. The method of claim 4, wherein the VI Remote Direct Memory Access is initiated by the host computer.

6. The method of claim 4, wherein the VI Remote Direct Memory Access is initiated by a Redundant Array of Inexpensive Disks device.

7. The method of claim 1, further comprising:

storing each 1/Nth data block in a memory coupled to a Redundant Array of Inexpensive Disks controller.

8. A Redundant Array of Inexpensive Disks (RAID) device for storing a data block received from a host computer, said RAID device comprising:

a RAID controller;

N disk drives coupled to said RAID controller;

a transport coupled to said RAID controller; and a network interface controller coupled to said RAID controller;

wherein when the data block is being stored, said transport comprises

N virtual interface (VI) queue pairs that form N virtual channels to the host computer, wherein said queue pairs receive 1/Nth of the data block over the N virtual channels;

wherein said RAID controller is adapted to write each of the 1/Nth data blocks to a different one of said N disk drives.

9. The RAID device of claim 8, wherein said RAID controller is further adapted to:

receive a storage request from the host computer for the data block; and post a descriptor to each of the queue pairs, each descriptor referring to 1/Nth of the data block.

10. The RAID device of claim 9, wherein the storage request is a VI send.

11. The RAID device of claim 9, wherein said RAID controller is further adapted to initiate a VI Remote Direct Memory Access in response to the storage request.

12. The RAID device of claim 8, wherein the N virtual channels comprise one or more physical connections.

13. A Redundant Array of Inexpensive Disks (RAID) system for striping a data block across N disk drives, said RAID system comprising:

means for receiving a storage request from a host computer for the data block;

means for creating N virtual interface (VI) queue pairs, wherein the queue pairs form N virtual channels to the host computer;

means for posting a descriptor to each of the queue pairs, each descriptor referring to 1/Nth of the data block;

means for receiving 1/Nth of the data block over each of the virtual channels; and means for writing each received 1/Nth data block to a different one of the N disk drives.

14. The RAID system of claim 13, wherein the N virtual channels comprise one or more physical connections.

15. The RAID system of claim 13, wherein the storage request is a VI send.

16. The RAID system of claim 13, further comprising:

means for initiating a VI Remote Direct Memory Access in response to the request.

17. The RAID system of claim 16, wherein the VI Remote Direct Memory Access is initiated by the host computer.

18. The RAID system of claim 16, wherein the VI Remote Direct Memory Access is initiated by a RAID device.

19. The RAID system of claim 13, further comprising:

means for storing each 1/Nth data block in a memory coupled to a RAID controller.

20. A method of stripping data across a redundant array of independent disks, comprising:

receiving a request from a host computer to store a data block in the redundant array of independent disks;

generating a number of virtual channels, wherein said number of virtual channels is represented by the variable N;

assigning a plurality of descriptors to a plurality of queue pairs associated with each disk, wherein each queue pair of the plurality of queue pairs comprises a send queue and a receive queue;

moving a 1/Nth portion of the data block from each send and receive queue of the plurality of queue pairs to N locations in a redundant array of independent disks controller memory; and writing each 1/Nth portion of the data block stored in the N locations of the redundant array of independent disks controller memory to a different storage device connected to the redundant array of independent disks controller memory.

* * * * *